United States Patent [19]

Kasano et al.

[11] Patent Number: 4,837,616
[45] Date of Patent: Jun. 6, 1989

[54] IMAGE PROCESSING APPARATUS SUITABLE FOR MEASURING DEPTH OF GIVEN POINT WITH RESPECT TO REFERENCE POINT USING TWO STEREOSCOPIC IMAGES

[75] Inventors: Akira Kasano; Yoichi Inoue, both of Tokyo, Japan

[73] Assignee: Kabushiki Kaisha Toshiba, Kawasaki, Japan

[21] Appl. No.: 207,831

[22] Filed: Jun. 17, 1988

[30] Foreign Application Priority Data

Jun. 19, 1987 [JP] Japan .................................. 62-151346

[51] Int. Cl.⁴ ........................... G01C 3/08; G06K 9/52
[52] U.S. Cl. ......................................... 358/107; 356/1; 382/23; 358/88
[58] Field of Search ...................... 358/107, 88; 356/1; 382/23

[56] References Cited

U.S. PATENT DOCUMENTS 4,581,762  4/1986  Lapidus .................................. 382/23
4,695,156  9/1987  Taft ........................................ 356/1

Primary Examiner—Howard W. Britton
Attorney, Agent, or Firm—Finnegan, Henderson, Farabow, Garrett, & Dunner

[57] ABSTRACT

First and second images as stereoscopic images of an object are obtained. The second image is shifted by a value dx. Absolute values of differences between image data of the shifted image and the first image are calculated, thus obtaining a third image. The third image is subjected to average value filtering to obtain a fourth image. A fifth image which has the same size as that of the fourth image and has a maximum gray level in an initial state is prepared. Image data having a smaller value is selected from image data of the fourth and fifth images to obtain a sixth image. Absolute values of differences between image data of the sixth and fifth images are calculated, thus obtaining a seventh image having the calculated absolute values as image data. A ninth image which has the same size as that of the seventh image. When the gray level of the pixel of the sevength image is 0, an eighth image is obtained to have the image data of the ninth image. When the gray level of the pixel of the seventh image is other than 0, the eighth image is obtained to have image data representing a gray level corresponding the value dx as the image data. After the eighth image is obtained, the sixth image is set as the fifth image, the eighth image is set as the ninth image and value dx is updated, and the eighth image is repetitively obtained. The finally obtained eighth image is determined as a parallax image representing a deviation of positions of corresponding pixels on the first and second images by gray levels. Based on the parallax image, a to an arbitrary point with respect to a reference point is determined.

11 Claims, 4 Drawing Sheets

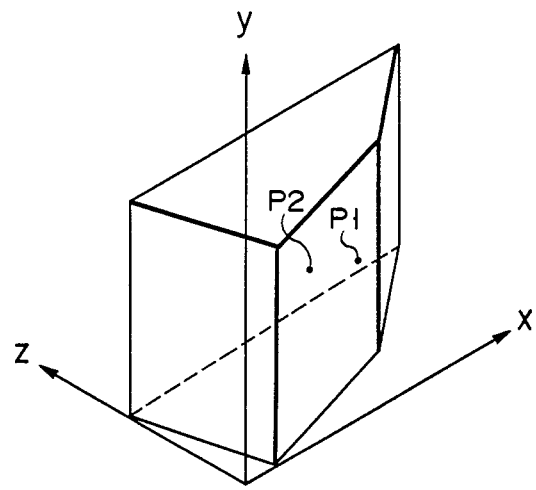
FIG. 1
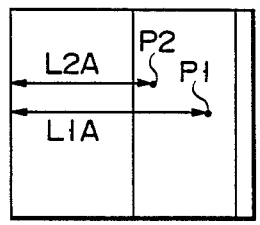 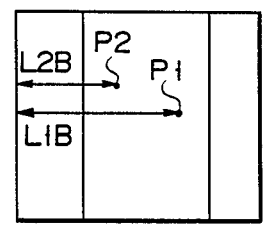
FIG. 2A        FIG. 2B

| dx | GRAY LEVEL |
|---|---|
| -128 | 0 |
| -127 | 1 |
| -1 | 127 |
| 0 | 128 |
| 1 | 129 |
| 127 | 255 |

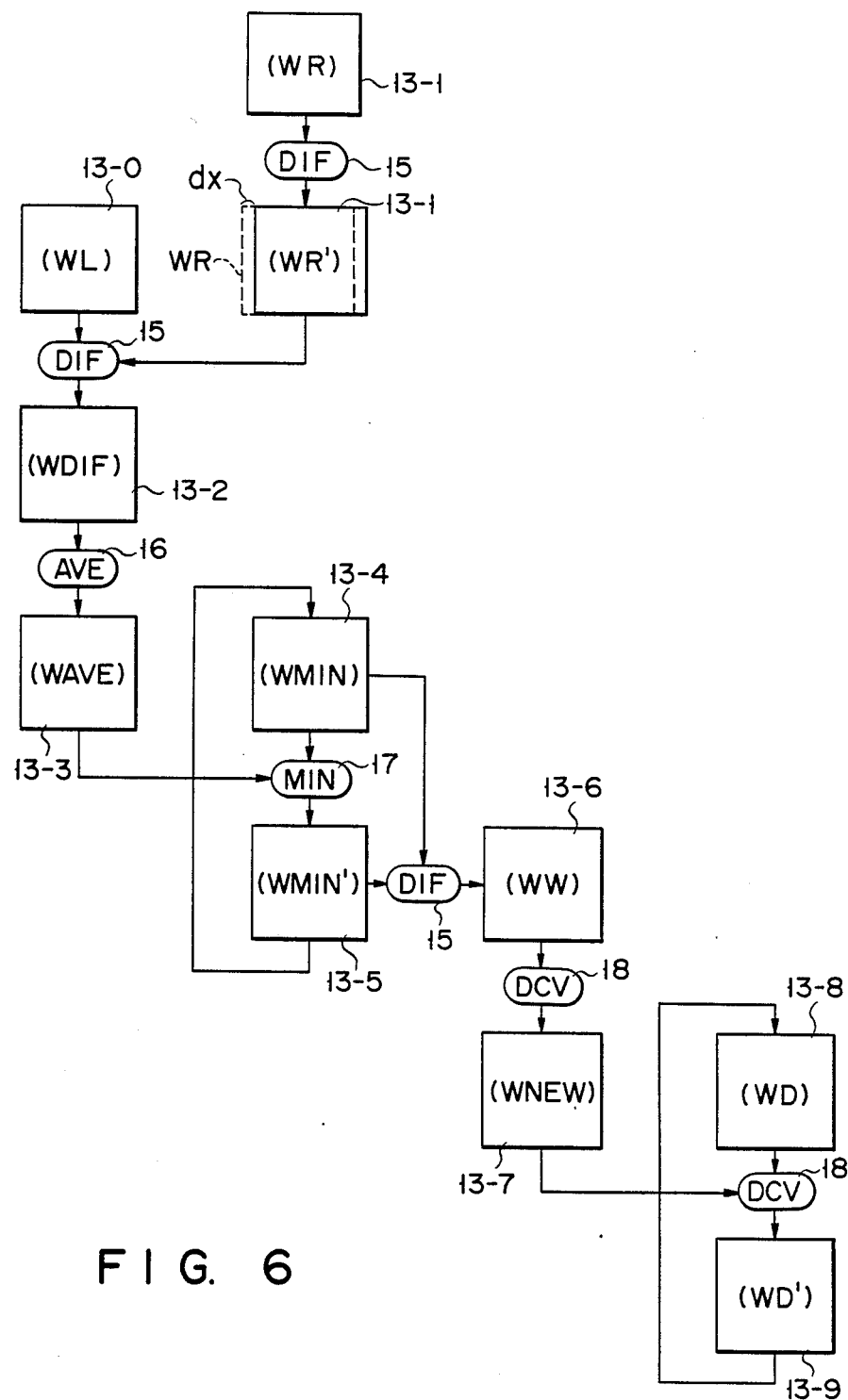
F I G. 6

IMAGE PROCESSING APPARATUS SUITABLE FOR MEASURING DEPTH OF GIVEN POINT WITH RESPECT TO REFERENCE POINT USING TWO STEREOSCOPIC IMAGES

BACKGROUND OF THE INVENTION

1. Field of the Invention

The present invention relates to an image processing apparatus suitable for measuring a position (depth) of a given point with respect to a reference point on a three-dimensional object based on a parallax of two stereoscopic images of the three-dimensional object.

2. Description of the Related Art

A method of measuring, e.g., a distance (depth or height) of point P2 in a z-axis with respect to point P1 of a three-dimensional object shown in FIG. 1 using two stereoscopic images is disclosed in "Johoshori Gakkaishi Vol. 22, No. 9, pp. 846–847 issued on September, 1981. This method of measuring the distance will be briefly described below. First, two images (stereoscopic images) when a three-dimensional object to be measured is viewed from different angles are obtained. For example, when the three-dimensional object shown in FIG. 1 is viewed from one direction, an image shown in FIG. 2A is obtained. When the object is viewed from another direction, an image shown in FIG. 2B is obtained. Then, corresponding points on two stereoscopic images are obtained. A distance from a reference point to a given point on the three-dimensional object is calculated based on a deviation (parallax) of positions of the corresponding points on the images.

The corresponding points on the two stereoscopic images are obtained by the following conventional method. That is, assume that one of the two stereoscopic images is given as a reference image. The similarity between images around a given pixel on the reference image and images around each pixel in a search area of the other image is calculated. A pixel providing the maximum similarity within the search area is determined as a pixel corresponding to the given pixel of the reference image.

With the above method, when the distances to a large number of points on an object are calculated, a large number of calculations must be performed in order to detect corresponding points on two stereoscopic images and to calculate a deviation of positions of the corresponding points on the images, resulting in time-consuming. In a conventional image processing apparatus, it takes a very long time to calculate distances to a large number of points on an object.

SUMMARY OF THE INVENTION

It is an object of the present invention to provide an image processing apparatus which can detect corresponding points on two stereoscopic images at high speed and can calculate a deviation of positions of corresponding points on images.

It is another object of the present invention to provide an image processing apparatus which can measure a depth or height of an arbitrary point with respect to a reference point on a three-dimensional object at high speed based on the calculated deviation of positions.

In order to achieve the above object, an image processing apparatus according to the present invention comprises:

first frame memory means (13-0) for storing a first image (WL) as a two-dimensional gray-level image obtained when a three-dimensional object to be measured (22) is viewed from a predetermined direction, a position of each pixel of the first image being expressed by coordinates defined by a first direction (x) and a second direction (y) perpendicular to the first direction (x);

second frame memory means (13-1) for storing a second image (WR) as a two-dimensional gray-level image obtained when the three-dimensional object to be measured (22) is viewed from a direction different from the predetermined direction, a position of each pixel of the second image (WR) being expressed by coordinates defined along the first and second directions (x, y), and a deviation between the first and second images (WL, WR) being generated in one direction (x) of the first and second directions (x, y);

shift image generating means (15) for shifting the second image (WR) by a value in the one direction within a predetermined range to obtain a shifted image (WR');

third image generating means (15) for calculating absolute values of differences between image data of pixels at identical coordinate positions of the shift and first images (WR', WL), and obtaining a third image (WDIF) represented by the calculated absolute values as the image data of pixels at the corresponding coordinate position the third image (WDIF);

average value filtering means (16) for performing average value filtering processing for each pixel of the third image (WDIF) so as to obtain a fourth image (WAVE);

means for holding a fifth image (WMIN) which has the same size as that of the fourth image (WAVE) and each pixel of which has a maximum gray level in an initial state;

sixth image generating means (17) for selecting image data having a smaller value from image data of pixels at identical positions of the fourth and fifth images (WAVE, WMIN), and obtaining a sixth image (WMIN') represented by the selected image data as image data of pixels at the corresponding coordinate positions the sixth image (WMIN');

seventh image generating means (15) for calculating absolute values of differences between image data of pixels at identical coordinate positions of the sixth and fifth images (WMIN', WMIN), and obtaining a seventh image (WW) represented by the calculated absolute values of the differences as image data of pixels at the corresponding coordinate positions thereof;

means for holding an eighth image (WD) having the same size as that of the seventh image (WW);

ninth image generating means (18) for detecting a gray level of each pixel of the seventh image (WW), and for, when the detected gray level is 0, obtaining a ninth image (WD') represented by the image data of pixels at the corresponding coordinate positions as image data of pixels at the corresponding coordinate positions of the ninth image (WD'), and when the detected gray level is other than 0, obtaining the ninth image (WD') represented by the image data indicating a gray level corresponding to the value dx as image data of pixels at the corresponding coordinate positions of the ninth image (WD'); and means (11) for, after the ninth image (WD') is obtained, setting the sixth image (WMIN') as the fifth image (WMIN) and the ninth image (WD') as the eighth image (WD) and updating the value dx, for repetitively obtaining the ninth image (WD'), and for determining the finally obtained ninth image (WD') as a parallax image representing a deviation of corresponding pixels on the first and second images (WL, WR) by gray levels.

According to the present invention, an image processing method comprises the steps of:

obtaining a first image (WL) as a two-dimensional gray-level image when a three-dimensional object to be measured (22) is viewed from a predetermined direction, a position of each pixel of the first image being expressed by coordinates defined by a first direction (x) and a second direction (y) perpendicular to the first direction (x);

obtaining a second image (WR) as a two-dimensional gray-level image obtained when the three-dimensional object to be measured (22) is viewed from a direction different from the predetermined direction, a position of each pixel of the second image (WR) being expressed by coordinates defined by the first and second directions (x, y), and a deviation between the first and second images (WL, WR) being generated in only one direction (x) of the first and second directions (x, y);

shifting the second image (WR) by a value in the one direction within a predetermined range to obtain a shifted image (WR') and calculating absolute values of differences between image data of pixels at identical coordinate positions of the shifted and first images (WR', WL) so as to obtain a third image (WDIF) which is represented by the calculated absolute values as the image data of pixels at the corresponding coordinate positions of the third image (WDIF);

performing average value filtering processing for each pixel of the third image (WDIF) to obtain a fourth image (WAVE);

preparing a fifth image (WMIN) which has the same size as that of the fourth image (WAVE) and each pixel of which has a maximum gray level in an initial state;

selecting image data having a smaller value from image data of pixels at identical positions of the fourth and fifth images (WAVE, WMIN), and obtaining a sixth image (WMIN') to have the selected image data as image data of pixels at the corresponding coordinate positions of the sixth image (WMIN');

calculating absolute values of differences between image data of pixels at identical coordinate positions of the sixth and fifth images (WMIN', WMIN), and obtaining a seventh image (WW) represented by the calculated absolute values of the differences as image data of pixels at the corresponding coordinate positions of the seventh image (WW);

preparing an eighth image (WD) having the same size as that of the seventh image (WW);

detecting a gray level of each pixel of the seventh image (WW), and when the detected gray level is 0, obtaining a ninth image (WD') represented by the image data of pixels at the corresponding coordinate positions as image data of pixels at the corresponding coordinate positions of the ninth image (WD'), and when the detected gray level is other than 0, obtaining the ninth image (WD') represented by the image data indicating a gray level corresponding to the value dx as image data of pixels at the corresponding coordinate positions of the ninth image (WD'); and after the ninth image (WD') is obtained, setting the sixth image (WMIN') as the fifth image (WMIN) and the ninth image (WD') as the eighth image (WD) to update the value dx, repetitively obtaining the ninth image (WD'), and determining the finally obtained ninth image (WD') as a parallax image representing a deviation of corresponding pixels on the first and second images (WL, WR) by gray levels.

With the above arrangement, according to the image processing apparatus and method of the present invention, all the points (pixels) on two stereoscopic images can be easily corresponded at high speed, and deviations (parallax) of positions within the images for every corresponding points can be easily calculated at high speed. Then, the distance to the respective points can be easily calculated based on the calculated parallax.

BRIEF DESCRIPTION OF THE DRAWINGS

FIGS. 1, 2A and 2B are views for explaining stereoscopic images;

FIG. 6 is a flow chart showing data processing together with the arrangement for explaining an operation of the image processing apparatus according to the present invention.

DETAILED DESCRIPTION OF THE PREFERRED EMBODIMENTS

Figure 3:
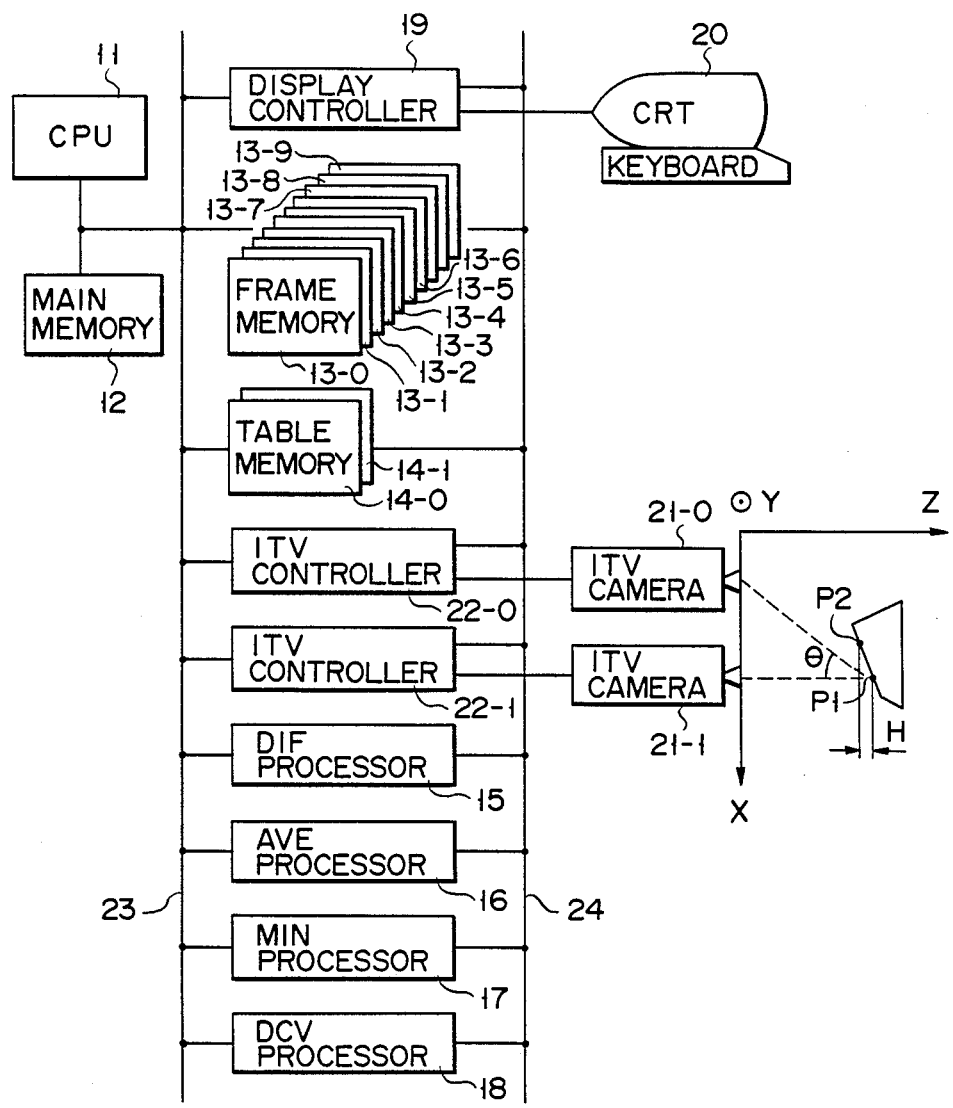
FIG. 3 is a block diagram for explaining an arrangement of an image processing apparatus according to an embodiment of the present invention.

A configuration of an image processing apparatus according to an embodiment of the present invention will be described with reference to FIG. 3.

CPU 11 controls the overall image processing apparatus. CPU 11 is connected to control bus 23. Control bus 23 transfers a variety of control data. Control bus 23 is connected to main memory 12. Control bus 23 is also connected to frame memories 13-0 to 13-9. Each of frame memories 13-0 to 13-9 retains two-dimensional images, has a capacity of, e.g., 2048 pixels (x-axis)×2048 pixels (y-axis), and stores 8-bit image data (gray-level data) for each pixel. Control bus 23 is connected to table memories 14-0 and 14-1. Table memory 14-0 stores a data conversion table shown in FIG. 5. Table memory 14-1 stores a data conversion table shown in FIG. 6.

Control bus 23 is connected to image processor 15 for processing two-dimensional gray-level images. Image processor 15 calculates an absolute value of a difference between image data of corresponding pixels on two images, and causes a memory to store the calculate absolute value. Processor 15 will be referred to as DIF processor 15 hereinafter. Control bus 23 is connected to image processor 16 for processing two-dimensional gray-level images. Processor 16 calculates an average value of gray levels (image data) of m×n pixels around each pixel on two images, and outputs the average value as the image data of a central pixel to be stored in the memory. Processor 16 will be referred to as AVE processor 16 hereinafter. Control bus 23 is connected to processor 17 for processing two-dimensional gray-level images. Processor 17 compares the gray levels (image data) of corresponding pixels of two images, and selects and stores a smaller one in the memory. Processor 17 will be referred to as MIN processor 17 hereinafter. Control bus 23 is connected to processor 18 for processing two-dimensional gray-level images. Processor 18 performs data conversion using table memories 14-0 and 14-1. Processor 18 will be referred to as DCV processor 18 hereinafter. DCV processor 18 has a function of converting 8-bit image data into another 8-bit image data using table memory 14-0, and a function of coupling the least significant bit of 8-bit image data with another 8-bit image data and converting the coupled 9-bit image data into 8-bit image data using table memory 14-1.

Control bus 23 is connected to display controller 19.

Control bus 23 is connected to ITV controllers 22-0 and 22-1.

Image bus 24 for transferring image data is connected to memories 13-0 to 13-9, 14-0, and 14-1, processors 15 to 18, and controllers 19, 22-0, and 22-1.

CRT monitor 20 is connected to display controller 19. CRT monitor 20 performs predetermined display under the control of the display controller.

ITV camera 21-0 is connected to ITV controller 22-0. Camera 21-0 images a three-dimensional object to obtain a two-dimensional gray-level image. ITV camera 21-1 is connected to ITV controller 22-1. Camera 21-1 also images a three-dimensional object to obtain a two-dimensional gray-level image. ITV cameras 21-0 and 21-1 are arranged to be offset in the x-axis in a three-dimensional space to image single object 22.

Figures 4, 5, 7:
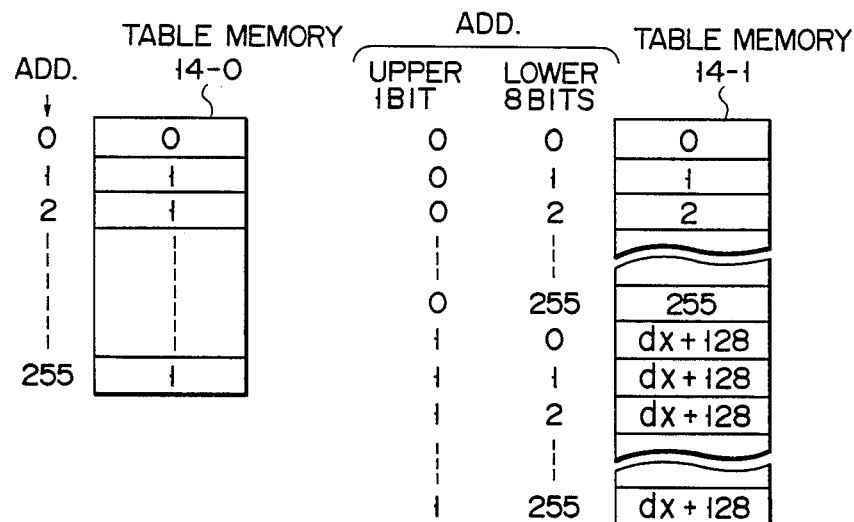
FIG. 4 shows a format of a table stored in table memory 14-0 shown in FIG. 3.
FIG. 5 shows a format of a table stored in table memory 14-1 shown in FIG. 3.
FIG. 7 is a view showing the relationship between a gray level of each pixel of parallax image WD and deviation dx.

The format of a table stored in table memory 14-0 will be described with reference to FIG. 4. The table has 256 entries. An 8-bit address is assigned to each entry. Of 256 entries, 8-bit data indicating a value "0" is stored in an entry at address "0". In entries of addresses "1" to "255", 8-bit data indicating a value "1" are respectively stored.

The format of a table stored in table memory 14-1 will be described with reference to FIG. 5. The table has 512 entries. A 9-bit address is assigned to each entry. Of 512 entries, in each entry at an address having the most significant bit "0", 8-bit data coinciding with lower 8-bits of the address is stored. In each entry at an address having the most significant bit "1", 8-bit data obtained by adding 128 to deviation dx (to be described later) is stored.

An image processing operation of the image processing apparatus shown in FIG. 3 will be described with reference to FIG. 6.

CPU 11 loads an initial image of image WMIN prestored in main memory 12 in frame memory 13-4. All the image data (8 bits) of pixels of the initial image of image WMIN indicate a maximum value (255). Similarly, CPU 11 loads the initial image of image WD (parallax image) prestored in main memory 12 in frame memory 13-8. All the image data (8 bits) of pixels of the initial image of parallax image WD indicate a minimum value (0).

A three-dimensional object to be measured is imaged by two ITV cameras 21-0 and 21-1 which are mounted to be offset in the x-axis in a three-dimensional space defined by x, y, and z, as shown in FIG. 3. Image WL imaged by ITV camera 21-0 is stored in frame memory 13-0 via image bus 24 under the control of ITV controller 22-0. Image WR imaged by ITV camera 21-1 is stored in frame memory 13-1 via image bus 24 under the control of ITV controller 22-1. A deviation in images WL and WR stored in frame memories 13-0 and 13-1 is generated in only the x-axis.

In this embodiment, parallax image WD is obtained based on two stereoscopic images WL and WR by repeating following steps (1) to (7). Parallax image WD represents a deviation of corresponding pixels on a reference image (in this case, image WL) and the other image (WR) in units of gray levels. In this embodiment, assume that deviation dx falls within the range of −128 to 127. In order to express deviation dx by a gray level, deviation dx is converted to one of values 0 to 255, as shown in FIG. 7.

(1) CPU 1 starts DIF processor 15. DIF processor 15 shifts image WR stored in frame memory 13-1 by value dx (with a sign) in the x-axis within a predetermined parallax range. The obtained image is given as WR'. In this embodiment, the parallax range is defined by a −128th pixel to a 127th pixel.

DIF processor 15 calculate an absolute value of a difference between image data of pixels at identical coordinate positions (x,y) (or pixel positions) on image WR' and reference image WL. Processor 15 stores the calculation result in a storage area of the identical coordinate position (x,y) in frame memory 13-2 as 8-bit image data. For example, when dx corresponds to one pixel, a pixel at a coordinate position (x,y)=(2,3) on image WR is converted to a pixel at a coordinate position (3,3) on image WR'. When image data of a pixel at a coordinate position (3,3) on image WL is "00000000" and image data a pixel at a coordinate position (3,3) on image WR' is "00000011", the absolute value of a difference between the two image data is "00000011", and data "00000011" is stored in the storage area of the coordinate position (3,3) in frame memory 13-2.

Processor 15 executes the above processing for all the areas of frame memories 13-0 and 13-1 (i.e., all the pixels of images WL and WR'). As a result, data indicating the absolute values of differences of gray levels of pixels at identical coordinate positions on images WL and WR' are stored in frame memory 13-2. A two-dimensional gray-level image constituted when the data stored in frame memory 13-2 is regarded as gray-scale data is given as WDIF.

(2) When processor 15 obtains image WDIF in frame memory 13-2, it sends a message indicating that to CPU 11 via control bus 23. CPU 11 starts AVE processor 16 in response to the message from processor 15. Processor 16 filters image WDIF in frame memory 13-2 using an average value filter having a size of m×n pixels. More specifically, processor 16 calculates an average value of image data of m n pixels around each pixel of image WDIF, and stores the average value at the corresponding coordinate position in frame memory 13-3. Such processing is called average value filtering processing. For example, regarding pixel of a coordinate position (x,y)=(1000,1000) of image WDIF, if m=15 and n=15, processor 16 calculates an average value of image data of 15×15 pixels at coordinate positions (993,993) to (1007,993), (993,994) to (1007,994), . . . , (993,1007) to (1007,1007), and stores the calculated value in a storage area of a coordinate position (1000,1000) in frame memory 13-3. Processor 16 performs the average value filtering processing for all the areas of frame memory 13-2. A two-dimensional gray-level image constituted when the average values stored in frame memory 13-3 are treated as gray-scale data is called image WAVE.

Image data of each pixel of image WAVE represents an evaluation value of a similarity between images WL and WR' when deviation between images WR and WR' is dx. The smaller the evaluation value is, the higher the similarity of images around pixels becomes.

(3) When processor 16 obtains image WAVE in frame memory 13-3, it sends a message indicating this to CPU 11. CPU 11 starts MIN processor 17 in response to the message from processor 16. MIN processor 17 selects smaller data from image data of pixels at identical coordinate positions (x,y) of image WAVE stored in frame memory 13-3 and image WMIN stored in frame memory 13-4. Processor 17 stores the selected data in a storage area of an identical coordinate position in frame memory 13-5. For example, when data "00000000" is stored at a coordinate position (1000,1000) in frame memory 13-3 and data "00000011" is stored at a coordinate position (1000,1000) in frame memory 13-4, processor 17 selects the data "00000000", and stores the selected data "00000000" at the coordinate position (1000,1000) in frame memory 13-5. Processor 17 executes the above processing for all the pixels of images WAVE and WMIN stored in frame memories 13-3 and 13-4. A two-dimensional gray-level image constituted when data stored in frame memory 13-5 are regarded as gray-scale data is given as image WMIN'.

Image data of each pixel of image WMIN is a minimum evaluation value of those indicating a similarity between images WL and WR' at previous deviation dx. In contrast to this, image data of each pixel of image WMIN' is a minimum evaluation value at series of deviations dx including present deviation dx.

As will be described later, image WMIN' is used as image WMIN in the next processing. Image data of each pixel of WMIN is value loaded from main memory 12 in the first processing (dx=initial value), and is a maximum value (255). In this case, image data of image WAVE are selected for all the pixels. Therefore, image WMIN' coincides with image WAVE.

(4) When processor 17 obtains image WMIN' in frame memory 13-5, it sends a message indicating this to CPU 11. CPU 11 starts DIF processor 15 again in response to the message from processor 17. Processor 15 calculates the absolute value of a difference between image data of pixels at identical coordinate positions on image WMIN in frame memory 13-4 and image WMIN' in frame memory 13-5, and stores the calculation result in a storage area at the identical coordinate position (x,y) in frame memory 13-6 as 8-bit data. For example, when data "00000011" is stored at a coordinate position (1000,1000) in frame memory 13-4 and data "00000000" is stored at a coordinate position (1000,1000) frame memory 13-5, processor 15 stores data "00000011" at a coordinate position (1000,1000) in frame memory 13-6. Processor 15 performs this processing for all the storage areas of frame memories 13-4 and 13-5. A two-dimensional gray-level image formed when data stored in frame memory 13-6 is regarded as gray-scale data is given as image WW.

As described above, image WMIN' is constituted by smaller image data of image data of pixels at the identical coordinate positions (x,y) of images WAVE and WMIN. For this reason, image data of each pixel of image WW becomes a positive value at a pixel where image data of image WAVE is smaller than that of image WMIN, and becomes 0 at a pixel where image data of image WAVE is equal to or larger than that of image WMIN. That is, the image data of each pixel of image WW becomes a positive value at a pixel where an evaluation value at a series of "dx"s including present dx is smaller than that at previous dx, and becomes 0 at a pixel where the evaluation value at a series of "dx"s including present dx is equal to or larger than that at previous dx.

(5) When DIF processor 15 obtains image WW in frame memory 13-6, it sends a message representing this to CPU 11. CPU 11 loads a data conversion table from main memory 12 into table memory 14-0 in response to the message from processor 15. Upon completion of the loading, CPU 11 starts DCV processor 18. The content of the data conversion table loaded in table memory 14-0 is shown in FIG. 4.

Processor 18 addresses the data conversion table in table memory 14-0 using, as an address, image data of each pixel at a coordinate position (x,y) of image WW stored in frame memory 13-6. Processor 18 reads out the content of a designated entry, and stores the readout content in a storage area at the identical coordinate position (x,y) in frame memory 13-7. More specifically, processor 18 converts image data of each pixel of image WW into data stored in the corresponding storage area of the data conversion table. For example data stored at a coordinate position (1000,1000) in frame memory 13-6 is "00000000", data "00000000" is stored at a coordinate position (1000,1000) in frame memory 13-7. If data stored at a coordinate position (1000,1000) in frame memory 13-6 is "00000001" or more, data "00000001" is stored at a coordinate position (1000,1000) in frame memory 13-7. Processor 18 performs this processing for all the storage areas of frame memory 13-6. A two-dimensional gray-level image formed when data stored in frame memory 13-7 are regarded as gray-scale data is called image WNEW. Image data at each pixel of image WNEW becomes "1" at a pixel where an evaluation value of a similarity in present deviation dx is smaller than a minimum evaluation value of a similarity in previous deviation dx (i.e., pixel at which a similarity in present deviation dx is larger than a similarity in previous deviation dx); otherwise, becomes 0.

(6) When DCV processor 18 obtains image WNEW in frame memory 13-7, it sends a message representing it to CPU 11. In response to this message, CPU 1 loads the data conversion table from main memory 12 to table memory 14-1. Thereafter, CPU 11 starts DCV processor 18 again. As described above, in an entry which is assigned with an address having the most significant bit of logic "0", 8-bit data equal to lower 8 bits of the address is stored. In an entry which is assigned with an address having the most significant bit of logic "1", 8-bit image data representing a gray level corresponding to deviation dx at that time is set. As described above, in this embodiment, deviation dx can vary within the range of −128 to 127, and is processed as a gray level. Therefore, 128 is added to deviation dx, and the gray level is expressed by a positive integer falling within the range of 0 to 255. FIG. 7 shows the relationship between deviations dx and gray levels.

When processor 18 is restarted by CPU 11, it generates 9-bit address data which has, as an upper address, the least significant bit of data representing a gray level (0 or 1) of each pixel at a coordinate position (x,y) of image WNEW stored in frame memory 13-7, and has, as a lower address, 8-bit image data of a pixel at the identical coordinate position (x,y) of image WD (obtained parallax image). Processor 18 addresses the data conversion table in table memory 14-1 using the generated 9-bit address data. Processor 18 writes data stored in a designated entry in a storage area at the identical coordinate position (x,y) in frame memory 13-9.

Processor 18 performs the above processing for all the coordinate positions (x,y) of frame memories 13-7 and 13-8. As described above, image data having the least significant bit of logic "1" of image WNEW means that the pixel has the highest similarity, and a gray level (dx+128) corresponding to present deviation dx is stored in a corresponding storage area of frame memory 13-9. Meanwhile, image data having the least significant bit of logic "0" of image WNEW has a lower similarity in present deviation dx than that in previous similarity dx. For this reason, the already stored gray level is stored in the corresponding storage area of frame memory 13-9. As a result, parallax image WD' having the higher similarity than image WD can be obtained in frame memory 13-9.

(7) When image WD' is obtained in frame memory 13-9, image data are transferred from frame memory 13-5 to frame memory 13-4, and image data are transferred from frame memory 13-9 to frame memory 13-8. Thus, Image WMIN' obtained in frame memory 13-5 by the processing in step (3) becomes new image WMIN in place of old image WMIN, and image WD' obtained in frame memory 13-9 by the processing in step (6) becomes new image WD in place of old image WD.

When the operations of (1) to (7) are completed for given deviation dx, dx is updated (e.g., incremented by 1), and the operations of (1) to (7) are performed again. In this case, dx in table memory 14-1 is also updated. When the operations of (1) to (7) are completed for all the "dx"s in the predetermined parallax range (in this embodiment, −128 to 127), the operation for obtaining parallax image WD is completed.

A value obtained by subtracting 128 from the image data of a given pixel of finally obtained parallax image WD represents a parallax of this pixel. For example, when image data of a pixel at a coordinate position (1000,1000) is 130, a parallax is 2 from FIG. 7, and a pixel of image WR corresponding to the pixel at the coordinate position (1000,1000) of image WL is (1002,1000).

A method of obtaining a distance to a given point on a three dimensional image with respect to a given reference point using parallax image WD will be described below.

For example, if distances to reference points P1 from the left ends of two stereoscopic images shown in FIGS. 2A and 2B are given by L1A and L1B, distances from the left ends of the images to points P2 are given by L2A and L2B, and an angle defined by eye points of two ITV cameras is given by $\theta$, as shown in FIG. 3, distance H of point P2 with respect to point P1 is expressed by the following equation:

$$H = (L1A/\tan\theta) - (L1B/\sin\theta)$$
$$- [(L2A/\tan\theta) - (L2B/\sin\theta)]$$

Therefore, if a coordinate position (x,y) of point P1 on a reference image is given as (x1,y1), and image data of a pixel at the coordinate position (x1,y1) of image WD is D1, L1A is x1, parallax dx1 is (D1−128), and distance L1B to point P1 from the left end of image WR is (x1+D1−128).

If a coordinate position (x,y) of point P2 on a reference image is given as (x2,y2), and image data of a pixel at the coordinate position (x2,y2) of image WD is D2, L2A is x2, parallax dx2 is (D2−128), and distance L2B to point P2 from the left end of image WR is (x2+D2−128). Therefore, distance H between points P2 and P1 is:

$$H = x1/\tan\theta - (x1+D1-128)/\sin\theta - [x2/\tan\theta$$
$$- (x2+D2-128)/\sin\theta]$$

Therefore, if an actual distance on three-dimensional object 22 corresponding to one coordinate position of an image (a distance between two pixels) is calculated in advance, height H can be calculated. For the sake of easy understanding, a distance between points P2 and P1 is calculated. However, the present invention is not limited to this, as a matter of course. A calculation may be performed using other formulas.

In the above embodiment, image data stored in each frame memory has 8 bits, and the parallax range is defined by −128 to 127. However, the present invention is not limited to these. Note that if the parallax range is changed, the gray levels shown in FIG. 7 are also changed.

In the above embodiment, in order to input stereoscopic images, two ITV cameras are used. However, the present invention is not limited to this. For example, a sample to be observed is rotated, so that stereoscopic images can be input from a single electron microscope. The present invention may be applied to automatic creation of a contour map from 2 aerial photographs. Furthermore, a three-dimensional solid display model can be constituted by the parallax image obtained according to the present invention.

In the above embodiment, the operations for storing the data conversion tables in table memories 14-0 and 14-1 are performed each time steps (5) and (b 6) are started. However, storage operations after the second and subsequent processing operations are not necessary. A corresponding table can be stored in a single table memory each time steps (5) and (6) are started. A data conversion table comprising a ROM may be used.

In the above embodiment, as an example of filtering, m=n=15 has been exemplified. However, the present invention is not limited to this. n and m may be different from each other. An average value of image data of pixels in a circular or oval range surrounding a given pixel may be calculated. Furthermore not only the average filtering method, but also any other known similarity calculation method can be used.

According to the present invention as described above, all the points (pixels) of two stereoscopic images can be easily corresponded at high speed and a deviation (parallax) of positions within the images can be easily calculated at high speed by processing a two-dimensional gray-level image regardless of a presence/absence of a feature point (edge) on the images. Then, a distance to an arbitrary point with respect to a reference point (height or depth) can be easily calculated based on the calculated parallax.

What is claimed is:

1. An image processing apparatus comprising:
   first frame memory means for storing a first image as a two-dimensional gray-level image obtained when a three-dimensional object to be measured is viewed from a predetermined direction, a position of each pixel of said first image being expressed by coordinates defined by a first direction and a second direction perpendicular to the first direction;

second frame memory means for storing a second image as a two-dimensional gray-level image obtained when said three-dimensional object to be measured is viewed from a direction different from said predetermined direction, a position of each pixel of said second image being expressed by coordinates defined along said first and second directions, and a deviation between said first and second images being generated in one direction of said first and second directions;

shifted image generating means for shifting, by a value, said second image within a predetermined range in said one direction to obtain a shifted image;

third image generating means for calculating the absolute values representing differences between image data of pixels located at identical coordinate positions in said shifted and first images, thereby obtaining a third image, the absolute values being image data representing gray levels of pixels located in said third image at coordinate positions which correspond to the pixel positions of said first and shifted images;

average value filtering means for performing average value filtering for each pixel of said third image so as to obtain a fourth image;

holding means for holding a fifth image having the same size as said fourth image, each pixel of said fifth image having a maximum gray level in an initial state;

sixth image generating means for selecting image data representing a smaller gray level from image data of pixels at identical coordinate positions of said fourth and fifth images, thereby obtaining a sixth image, the selected image data being image data representing gray levels of pixels in said sixth image located at coordinate positions which correspond to the pixel position of said fourth and fifth images;

seventh image generating means for calculating absolute values of differences between image data of pixels at identical coordinate positions in said sixth and fifth images, and processing the absolute value, thereby obtaining a seventh image, the absolute values being image data representing gray levels of pixels in said seventh image located at coordinate positions which correspond the pixel positions in said fifth and sixth images;

means for holding an eighth image having the same size as that of said seventh image;

ninth image generating means for detecting a gray level of each pixel of said seventh image, and obtaining a ninth image, when the detected gray level is 0, from the image data of pixel located at the corresponding coordinate position in the eighth image, which is used as image data representing a gray level of pixel located at the corresponding coordinate position in the ninth image, and, when the detected gray level is other than 0, from image data representing a gray level corresponding to said value dx, which is used as image data representing a gray level of pixel located at the corresponding coordinate position in said ninth image; and updating means for, after said ninth image has been obtained, setting said sixth image as said fifth image and said ninth image as said eighth image, updating the value dx, for repetitively obtaining said ninth image, and determining the finally obtained ninth image as a parallax image representing, by gray levels, a deviation of corresponding pixels in said first and second images by gray levels.

2. An apparatus according to claim 1, wherein said ninth image generating means comprises:

a first table for storing first data in an entry at address "0" and storing second data in other entries;

means for addressing said first table using the image data of each pixel of said seventh image;

means for obtaining a tenth image represented by values of addressed entries of said first table used as image data of pixels in said tenth image located at corresponding coordinate positions which correspond the pixel positions in said seventh image;

means for coupling image data of pixels at identical coordinate positions in said tenth and eighth images, such that image data of said tenth image serve as upper address portions, and image data of said eighth image serve as lower address portions;

a second table having a plurality of entries, for storing, in each entry, an upper address of which has the first data, a value identical to that of the lower address portion, and storing, in an entry, an upper address of which has the second data, image data representing a gray level corresponding to the value dx; and means for addressing said second table using the addresses coupled by said coupling means and obtaining said ninth image represented by the contents of designated entries used as image data of corresponding pixels in said ninth image.

3. An apparatus according to claim 1, wherein said average value filtering means calculates an average value of the gray levels of the predetermined pixels around each pixel of said second image, and determines the average value as image data representing a gray level of a pixel in said third image having a coordinate position which is identical to the pixel in said second image.

4. An apparatus according to claim 1, further comprising means for obtaining a distance to an arbitrary point with respect to a given reference point on a deviation of positions of corresponding pixels on said first and second images represented by said parallax image.

5. An image processing apparatus comprising: first frame memory means for storing a first image as a two-dimensional gray-level image obtained when a three-dimensional object to be measured is viewed from a predetermined direction, a position of each pixel of said first image being expressed by coordinates defined by a first direction and a second direction perpendicular to the first direction;

second frame memory means for storing a second image as a two-dimensional gray-level image obtained when said three-dimensional object to be measured is viewed from a different direction from said predetermined direction, a position of each pixel of said second image being expressed by coordinates defined along said first and second directions, and a deviation between said first and second images being generated in only one direction of said first and second directions;

means for shifting, by a value dx, said second image within a predetermined range in said one direction so as to obtain shifted image;

third image generating means for calculating similarities of image within predetermined area around the pixels located at identical coordinate positions in said shifted and first images and obtaining a third image represented by data indicating the similarities used as image data of pixels located at the corresponding coordinate positions of said third image;

means for holding a fourth image, said fourth image having substantially the same size as that of said third image, and represented by image data exhibiting minimum similarities in an initial state;

fifth image generating means for comparing image data of pixels located at identical coordinate positions in said third and fourth images, for, when the similarity indicated by the image data of said third image is larger than that of said fourth image, obtaining a fifth image being represented by the image data in said third image as image data of pixels at the corresponding coordinate positions of said fifth image, and when the similarity indicated by the image data of said third image is smaller than that of said fourth image, obtaining said fifth image represented by the image data in said fourth image as image data of pixels at the corresponding coordinate positions of said fifth image;

means for holding a sixth image having substantially the same size as that of said fifth image;

seventh image generating means for obtaining a seventh image represented by data indicating a gray level corresponding to a present value dx as image data of said seventh image of pixels at identical coordinate positions to the pixels for which said seventh image generating means determines that the similarity represented by the image data of said third image is larger than that of said fourth image data, and for obtaining said seventh image having the image data of said sixth image as image data of pixels at the corresponding coordinate positions of said seventh image for pixels at the identical coordinate positions to the pixels for which said seventh image generating means determines that the similarity represented by the image data of said third image is smaller than that of said fourth image data; and means for, after said seventh image is obtained, setting said fifth image as said fourth image and said seventh image as said sixth image and updating the value dx, for repetitively obtaining said seventh image, and for determining the finally obtained seventh image as a parallax image representing a deviation of corresponding pixels on said first and second images by gray levels.

6. An apparatus according to claim 5, wherein said third image generating means has:

means for calculating absolute values of differences between image data of pixels at identical coordinate positions of said shifted and first images and obtaining a tenth image to have the calculated absolute values as image data of pixels at identical coordinate positions thereof; and average value filtering means for performing average value filtering processing for each pixel of said tenth image to obtain said third image, the smaller image data of each pixel of said third image becomes, the higher the similarity becomes.

7. An apparatus according to claim 6, wherein said seventh image generating means has:

eleventh image generating means for calculating absolute values of differences between image data of pixels at identical coordinate positions of said fifth and fourth images and obtaining an eleventh image to have the calculated absolute values as image data of pixels at identical coordinate positions thereof; and means for detecting for detecting a gray level of each pixel of said eleventh image, and for, when the detected gray level is 0, obtaining said seventh image to have the image data of pixels at the corresponding coordinate positions of said six image as image data of pixels at the corresponding coordinate positions thereof, and when the detected gray level of a given pixel of said eleventh image is other than 0, obtaining said seventh image to have the image data representing a gray level corresponding to the value dx as image data of pixels at the corresponding coordinate positions thereof.

8. An image processing method comprising:

obtaining a first image as a two-dimensional gray-level image when a three-dimensional object to be measured is viewed from a predetermined direction, a position of each pixel of said first image being expressed by coordinates defined by a first direction and a second direction perpendicular to the first direction;

obtaining a second image as a two-dimensional gray-level image obtained when said three-dimensional object to be measured is viewed from a direction different from said predetermined direction, a position of each pixel of said second image being expressed by coordinates defined by said first and second directions, and a deviation between said first and second images being generated in one of said first and second directions;

shifting said second image by a value in said one direction within a predetermined range to obtain an image and calculating absolute values of differences between image data of pixels at identical coordinate positions of said shifted and first images so as to obtain a third image which is represented by the absolute values as the image data of pixels at the corresponding coordinate positions of said third image;

performing average value filtering processing for each pixel of said third image to obtain a fourth image;

preparing a fifth image which has the same size as that of said fourth image and each pixel of which has a maximum gray level in an initial state;

selecting image data having a smaller value from image data of pixels at identical positions of said fourth and fifth images, and obtaining a sixth image represented by the selected image data as image data of pixels at the corresponding coordinate positions of said sixth image;

calculating absolute values of differences between image data of pixels at identical coordinate positions of said sixth and fifth images, and obtaining a seventh image represented by the absolute values as image data of pixels at the corresponding coordinate positions of said seventh image;

preparing an eighth image having the same size as that of said seventh image;

detecting a gray level of each pixel of said seventh image, and when the detected gray level is 0, obtaining a ninth image having the image data of pixels located at the corresponding coordinate positions in said eighth image as image data of pixels at the corresponding coordinate positions of said eighth image, and when the detected gray level is other than 0, obtaining said ninth image having data representing a gray level corresponding to the value dx as image data of pixels at the corresponding coordinate positions of said eighth image; and after said ninth image is obtained, setting said sixth image as said fifth image and said ninth image as said eighth image and updating the value dx, repetitively obtaining said ninth image, and determining the finally obtained ninth image as a parallax image representing a deviation of corresponding pixels on said first and second images by gray levels.

9. A method according to claim 8, wherein the step of obtaining said ninth image comprises:

preparing a first table for storing first data in an entry of address "0" and storing second data in other entries;

addressing said first table using the image data of each pixel of said seventh image;

obtaining a tenth image which has values of addressed entries of said first table as image data of pixels at corresponding coordinate positions;

coupling image data of pixels at identical coordinate positions of said tenth and eighth images, such that image data of said tenth image serve as upper address portions, and image data of said eighth image serve as lower address portions;

preparing a second table for storing, in an entry, an upper address of which has the first data, a value identical to that of the lower address portion, and storing, in an entry, an upper address of which has the second data, image data representing a gray level corresponding to the value dx; and addressing said second table using the addresses coupled by the step of coupling the image data and obtaining said ninth image to have the contents of designated entries as image data of corresponding pixels thereof.

10. A method according to claim 8, wherein the step of performing average value filtering processing is to calculate an average value of image data of predetermined m$\times$n pixels around each pixel of said second image, and to determine the average value as image data of a pixel of said third image at the identical coordinate position to the pixel of said second image.

11. A method according to claim 8, further comprising the step of obtaining a distance to an arbitrary point with respect to a given reference point based on a deviation of positions of corresponding pixels on said first and second images represented by said parallax image.

* * * * *